Figure 3:
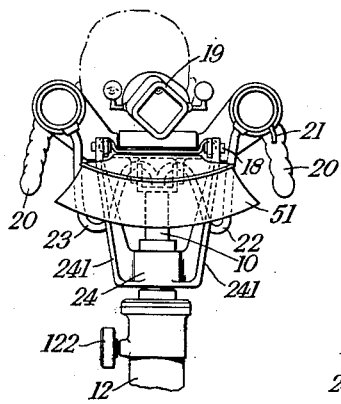

March 10, 1964  R. S. RANSOM ETAL  3,124,329
SUPPORT COLUMN FOR AN OPTICAL SIGHTING INSTRUMENT
Filed March 9, 1961  2 Sheets-Sheet 1

March 10, 1964   R. S. RANSOM ETAL   3,124,329
SUPPORT COLUMN FOR AN OPTICAL SIGHTING INSTRUMENT
Filed March 9, 1961   2 Sheets-Sheet 2

United States Patent Office 3,124,329
Patented Mar. 10, 1964

3,124,329
SUPPORT COLUMN FOR AN OPTICAL
SIGHTING INSTRUMENT
Richard Sutton Ransom, Holywood, County Down, and Mervyn Francis Wilson, Belfast, Northern Ireland, assignors to Short Brothers & Harland Limited, Belfast, Northern Ireland
Filed Mar. 9, 1961, Ser. No. 94,499
Claims priority, application Great Britain Mar. 21, 1960
3 Claims. (Cl. 248—160)

The invention has reference to visual command director installations for guided missiles, of the class in which for the purpose of guiding the missile towards the target the operator continuously views both target and missile in optical sighting apparatus which is capable of being trained in the operator's line of sight and with which are combined manually operated circuit control means for regulating the course of the missile. Where a director installation of this class is used in conditions in which it may be subjected to sudden and unpredictable lateral accelerations, such as are experienced for example on high speed motor torpedo boats and like naval craft, the operator may experience difficulty in adjusting his position to the sighting instrument so as to retain his view of the missile and/or target without risk of facial injury, and the physical and mental effort required to maintain a clear view of the optical display may deprive him of the capacity for the high degree of concentration needed for effective guidance of the missile. The present invention has for its object to provide, in a director installation of the class described, improved means for mounting the optical sighting and guiding instrument in a manner such that the aforementioned adverse conditions are ameliorated.

The invention provides for this purpose an optical sighting instrument support column which is capable (a) of lateral oscillation about two mutually perpendicular axes and (b) of rotation about its longitudinal axis (i.e. for azimuthal adjustment), and means for normally constraining the column towards a vertical position, the optical head incorporating handles by which the operator may hold it in viewing position, and the whole being free to turn or sway against the resilient influence of said constraining means to permit the operator to accommodate his position or attitude to lateral accelerations and motion of the craft.

The said column is conveniently provided with means for its longitudinal extension or contraction to suit the height of the operator, to accommodate accelerations in the vertical plane and the effect of extensions arising from elevating the optical head. The optical head may be mounted upon the top of the column so as to permit elevation or depression of the field of view with respect to the column.

Means may be provided whereby the angular movements of the column and the optical head are employed to generate electrical signals by which the rotating and elevating of an associated missile launching stand mounted upon the same craft may be adjusted about corresponding axes in sympathy with the motions of the optical head. Means may also be provided whereby the optical head is caused to respond to remotely generated electrical signals indicating the field of view to be observed.

Figure 2:
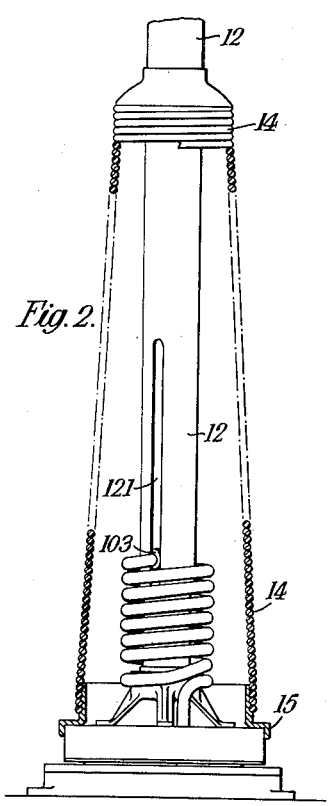
Figure 1:
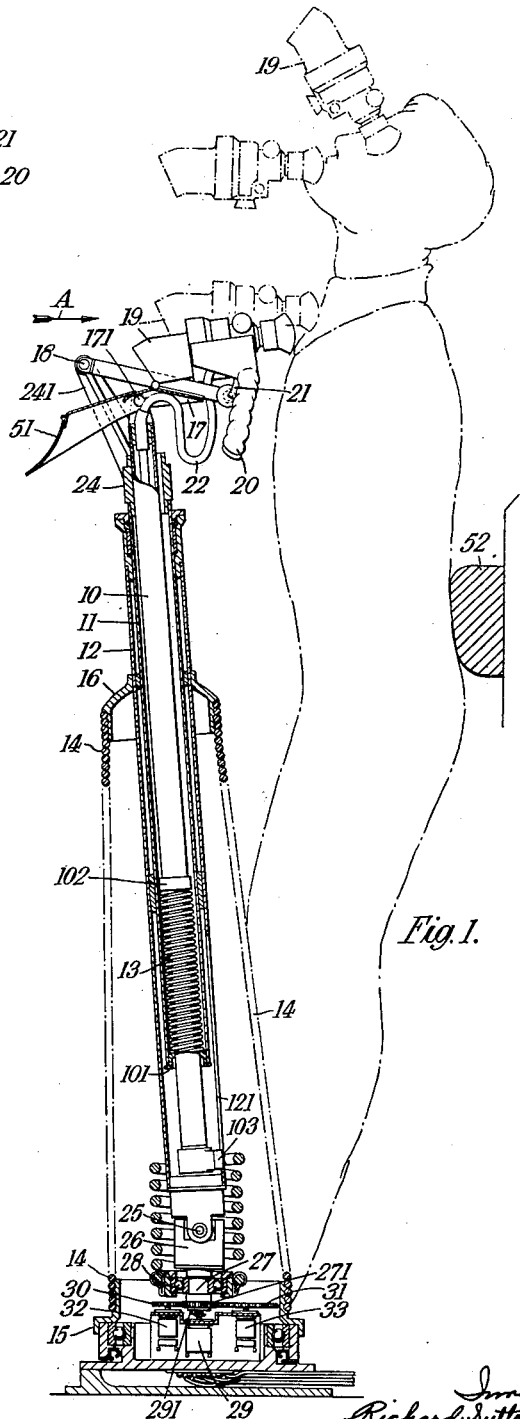
Figure 4:
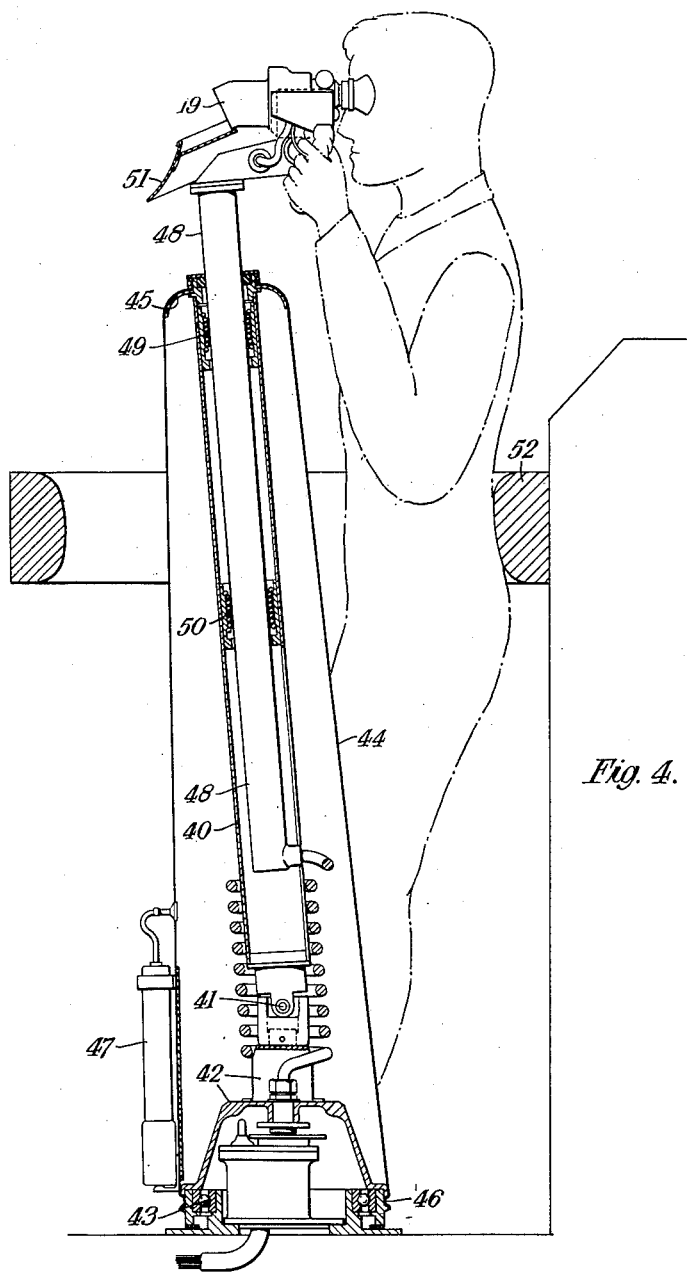

The manner in which the invention may be carried into effect is hereinafter more fully described with reference to the accompanying drawings, in which FIG. 1 is a partly sectional side elevation of one form of director column, FIG. 2 is a fragmentary view of the lower part thereof, FIG. 3 is a view of the upper part of the column as seen in the direction of the arrow A. FIG. 4 is a similar view to FIG. 1, showing a modified embodiment of the invention.

The director column illustrated in FIGS. 1 to 3 comprises three relatively slidable tubular sections, respectively indicated at 10, 11 and 12. The inner section 10 is laterally guided within the intermediate section 11 by the bearing 101 and is connected at its upper end to the optical head through the lever 17 (hereinafter referred to). A low rate spring 13 is compressed between the collar 102 fixed to the section 10 and the bearing member 101, and the section 10 is capable of axial movement relative to the intermediate section 11 to provide for adjustment of the height of the optical head resulting from elevation or depression of the operator's field of view; a range of movement between −10° and +60° may be permitted. The section 10 is also capable of oscillatory movement about its longitudinal axis with respect to the section 11, such movement being restrained by engagement of a dog 103 with a slot 121 in the outer section 12. The intermediate tubular section 11, together with the inner section 10, is capable of axial movement relative to outer section 12 for varying the effective length of the column and then of being locked by a locknut 122 (FIG. 3) to suit different operator heights.

In this case the greater part of the outer section 12 of the column is enclosed in a tapering helical spring 14 affixed at one end about a rotary base 15 and at the upper end to a collar 16 on the tube wall, such spring 14 serving to maintain the column yieldably in an upright position. The said spring may be enclosed in a weather-proof cover (not shown) to protect the mechanism of the column.

Pivotally mounted at points 172 upon the two levers 17, which in turn are pivotally supported on respective bracket arms of section 10 via pins 171 and pivotally connected by pins 18 to respective arms 241 of an upper extension 24 of the section 11, is the optical head 19, which may comprise a prismatic monocular lens system, one or more ring type sights, and at either side handles 20 by which the operator may grasp the optical head in both hands. One handle may house the missile firing button 21 whilst the other includes missile guidance control means. Connections between said handles 20 and the missile launching platform may be made by cables 22, 23 passed through the inner tubular section 10 of the column and the rotary base 15.

The optical head points 172 as above indicated, is pivotally mounted upon the levers 17 at 19, so as to be capable of pivoted movement when swivelled by the operator to elevate or depress the field of view.

The lower end of the outer tubular section 12 is connected by a universal joint unit 25 to a member 26 which is rotatably mounted in a bearing 28 for motion about a vertical or azimuthal axis. A transducer 29 is synchronised with a remotely generated signal indicating the bearing of the target and is thereby caused to drive a pickoff 291 which engages with a commutator segment embedded in the basal surface of a downward extension 27 of the member 26. Also fixed to said extension 27 is a gear pinion 271 which meshes with spur wheels 30 and 31 by which rotary motion is transmitted to transducers 32 and 33. As will be seen, said transducers 32, 33 are responsive to rotational movements of the column about an axis normal to the plane of the deck, for the purpose of transmitting proportional signals to the missile launching stand and thereby to achieve lateral movement of the latter in unison with the movements of the column, so as to ensure the constant approximate alignment of the launching stand in parallelism with that of the operator's sight-line. Transducers may also be mounted on the three axes permitting elevation of the sight line (i.e. one at each end of the lever supporting the monocular arrangement and one at the column pivot axis), so as to be responsive to movements of the optical head in a plane perpendicular to the deck for the purpose of transmitting proportional signals to the launching stand and thereby to achieve elevational movement of the latter in unison with the optical head.

In the modified embodiment of the invention illustrated in FIG. 4, the optical head is supported in a similar manner to that already described with reference to FIGS. 1 to 3, but the sighting instrument column consists of a two-section telescopic tubular strut, the outer section 40 of which is carried at its foot by a universal joint 41 based on a basal mounting 42 which is capable of rotation about an azimuthal axis in the bearing 43. The whole length of the said outer tubular section 40 is enclosed in a flexible envelope 44, a coiler 45 of which is sealed about the upper end of said outer section 40, whilst the skirt is sealed around the rim of the rotary base 42 at 46. A pump 47 for inflating the envelope 44 is provided, and the arrangement is such that, when so inflated, the envelope 44 has sufficient rigidity to support the column yieldably in an upright position.

The inner tubular section 48 of the column is supported by the air pressure within the envelope 44 and is provided with anti-friction bearings 49, 50 permitting it to move axially with freedom in the outer section 40, thus accommodating different operator heights and the extension arising from elevation of the sight.

In both columns described above, the optical head 19 is preferably provided with a wind shield 51 to protect the lenses from spray. It is contemplated that the operator will brace himself against a convenient back-rest attached to the structure of the craft, as indicated at 52, holding the column against his person, and thereby ensuring so far as possible that his own movements and those of the director column due to motion of the craft are in harmony and will have the minimum influence upon his task of guiding the missile to the target.

What we claim as our invention and desire to secure by Letters Patent is:

1. A support column for an optical sighting instrument, comprising a compound-section telescopic tube having at least two relatively longitudinally movable sections one of which is an upper section and the other a lower section, a rotatable base mounting for said tube, a universal joint connecting the foot of said lower section to said base mounting, means for mounting an optical sighting instrument on the said upper section of said tube whereby said instrument is capable of rotation about the longitudinal axis of the tube, radial motion in elevation, rotary motion in azimuth, and free axial adjustment in relation to the tube, and resilient means connected externally of said tube between said upper section and said rotatable base mounting for normally constraining the column towards a vertical position.

2. A column as in claim 1 wherein said tube is made of three telescopic tubular sections including said upper and lower sections, the third section being intermediate thereof, a low rate spring between and governing the relative axial movement of said inner section and the intermediate section, means for locking the relative axial adjustment of the intermediate and outer sections and connected therebetween, said resilient constraining means being a tapering helical spring and enclosing the said outer section and being attached at one end to the upper end of the outer section and at the other end to said rotatable base mounting.

3. A column as in claim 1 wherein said resilient constraining means is a flexible airtight envelope enclosing said tube between said upper section and rotatable connecting means, there being means for internally pressurizing said envelope.

References Cited in the file of this patent

UNITED STATES PATENTS

| | | |
|---|---|---|
| 1,828,892 | Felton | Oct. 27, 1931 |
| 2,118,041 | Estoppey | May 24, 1938 |
| 2,369,806 | Slonneger | Feb. 20, 1945 |
| 2,452,076 | Spencer | Oct. 26, 1948 |
| 2,460,461 | Larkin | Feb. 1, 1949 |
| 2,914,988 | O'Shei | Dec. 1, 1959 |
| 2,971,437 | Surtees | Feb. 14, 1961 |
| 3,008,703 | Slemmons | Nov. 14, 1961 |